(12) United States Patent
Flaming et al.

(10) Patent No.: US 10,556,758 B1
(45) Date of Patent: Feb. 11, 2020

(54) DENESTER AND METHOD OF DENESTING A STACK OF CONTAINERS

(71) Applicants: Max Flaming, Fresno, CA (US); Michael Reitz, Visalia, CA (US)

(72) Inventors: Max Flaming, Fresno, CA (US); Michael Reitz, Visalia, CA (US)

(73) Assignee: Maxco Supply, Inc., Parlier, CA (US)

( * ) Notice: Subject to any disclaimer, the term of this patent is extended or adjusted under 35 U.S.C. 154(b) by 18 days.

(21) Appl. No.: 15/866,111

(22) Filed: Jan. 9, 2018

Related U.S. Application Data

(60) Provisional application No. 62/468,702, filed on Mar. 8, 2017.

(51) Int. Cl.
| | |
|---|---|
| B65B 43/44 | (2006.01) |
| B65B 57/20 | (2006.01) |
| B65G 47/08 | (2006.01) |
| B65G 59/06 | (2006.01) |
| G06M 9/00 | (2006.01) |
| B65G 59/10 | (2006.01) |

(52) U.S. Cl.
CPC ............ *B65G 59/063* (2013.01); *B65B 57/20* (2013.01); *B65G 59/105* (2013.01); *B65G 59/106* (2013.01); *G06M 9/00* (2013.01)

(58) Field of Classification Search
CPC ....... B65B 57/20; B65B 23/14; B65G 47/082; B65G 59/105; B65H 2301/42622; B65H 33/16; B32B 38/10
See application file for complete search history.

(56) References Cited

U.S. PATENT DOCUMENTS

| | | | |
|---|---|---|---|
| 2,641,095 A | 6/1953 | Burbank | |
| 3,313,482 A | 4/1967 | Midgley et al. | |
| 3,603,462 A * | 9/1971 | Moser .................. | B65G 47/514 198/429 |
| 3,764,025 A | 10/1973 | Van Melle et al. | |
| 4,142,345 A | 3/1979 | Porter, Jr. | |

(Continued)

OTHER PUBLICATIONS

International Search Report and Written Opinion; International Searching Authority/US dated May 24, 2018; International Application No. PCT/US2018/020973; 10 pages; International Searching Authority/U.S., Commissioner for Patents, Alexandria, Virginia.

(Continued)

*Primary Examiner* — Gregory W Adams
(74) *Attorney, Agent, or Firm* — Andrew D. Fortney; Central California IP Group, P.C.

(57) ABSTRACT

An apparatus that denests a stack of containers and methods of separating a stack of containers and making the apparatus are disclosed. The apparatus includes a denester and a counting device. The denester is configured to separate a first stack of at least 2 containers into a plurality of second stacks of containers. Each of the second stacks includes an exact number of containers, the exact number being a positive integer less than m. The counting device is configured to count the exact number of containers in the first stack. The method of separating containers includes counting an exact number of containers in a first stack of m containers using the counting device, and separating the exact number of containers from the first stack using the denester.

18 Claims, 6 Drawing Sheets

(56) References Cited

U.S. PATENT DOCUMENTS

| | | | | |
|---|---|---|---|---|
| 4,825,378 A * | 4/1989 | Yuge | G07D 11/50 | 700/223 |
| 4,874,282 A * | 10/1989 | Orikasa | G03F 7/20 | 414/416.07 |
| 4,909,412 A * | 3/1990 | Cerf | B65G 59/105 | 221/1 |
| 4,962,538 A * | 10/1990 | Eppler | G06M 1/101 | 250/222.2 |
| 5,016,420 A * | 5/1991 | Chiappe | B65B 9/13 | 53/138.1 |
| 5,062,764 A * | 11/1991 | Welsch | B65H 3/242 | 414/796 |
| 5,095,684 A * | 3/1992 | Walker | B65B 57/12 | 198/462.2 |
| 5,281,082 A * | 1/1994 | Ghilardi | B65H 31/32 | 414/798.9 |
| 5,329,748 A * | 7/1994 | Belsito | B65B 43/44 | 53/127 |
| 5,336,043 A * | 8/1994 | Bader | B65B 57/20 | 198/429 |
| 5,425,457 A * | 6/1995 | Williams | B65H 3/26 | 209/547 |
| 5,463,839 A * | 11/1995 | Stange | B65B 5/103 | 53/250 |
| 5,534,690 A * | 7/1996 | Goldenberg | B65H 43/08 | 250/222.1 |
| 5,788,050 A * | 8/1998 | Mojden | G06M 7/00 | 198/419.1 |
| 5,984,622 A * | 11/1999 | Schum | B65H 3/08 | 271/97 |
| 6,013,920 A * | 1/2000 | Gordon | H01L 21/67265 | 250/559.33 |
| 6,182,962 B1 * | 2/2001 | Leuthold | B65H 1/24 | 271/126 |
| 6,443,689 B1 * | 9/2002 | Reggiani | B65G 47/846 | 221/222 |
| 7,382,910 B2 * | 6/2008 | Donders | G06M 1/101 | 382/135 |
| 7,570,786 B2 * | 8/2009 | Ateya | G06K 9/2027 | 382/103 |
| 7,726,932 B2 * | 6/2010 | Leblanc | B65G 59/105 | 414/796 |
| 9,216,869 B2 * | 12/2015 | Hildebrandt | B65H 1/04 | |
| 2006/0124656 A1 * | 6/2006 | Popovich, Jr. | G07F 9/026 | 221/9 |
| 2009/0022389 A1 * | 1/2009 | Lubbers | G07D 11/50 | 382/135 |
| 2010/0104413 A1 | 4/2010 | Irwin | | |
| 2011/0017693 A1 | 1/2011 | Thomas et al. | | |
| 2015/0318200 A1 * | 11/2015 | Ohno | H01L 21/6838 | 414/797 |

OTHER PUBLICATIONS

International Preliminary Report on Patentability dated Sep. 19, 2019; PCT International Application No. PCT/US2018/020973; 9 pages; The International Bureau of WIPO, Geneva Switzerland.

* cited by examiner

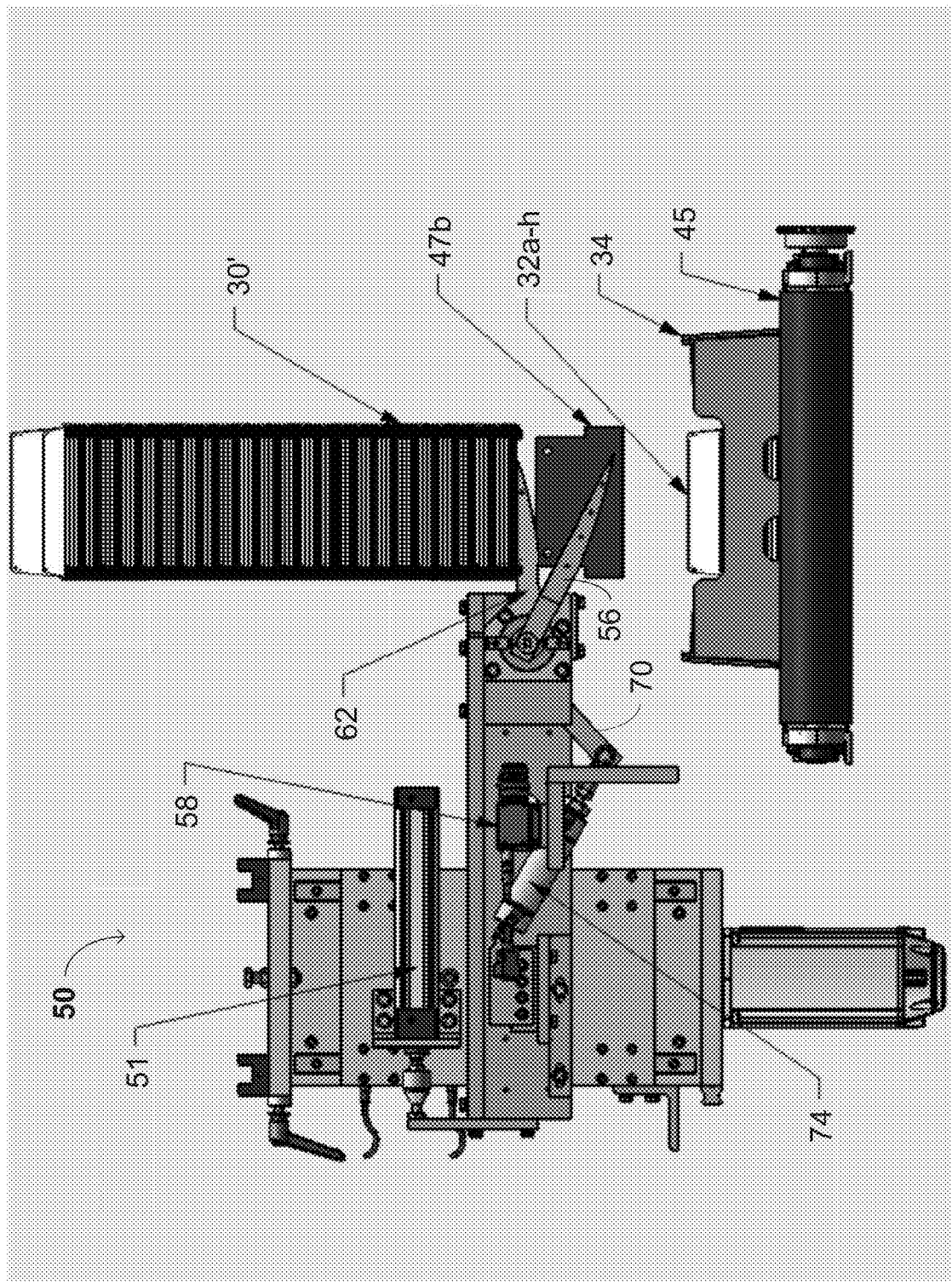

# DENESTER AND METHOD OF DENESTING A STACK OF CONTAINERS

RELATED APPLICATIONS

This application claims the benefit of U.S. Provisional Pat. Appl. No. 62/468,702, filed March 8, 2017, which is incorporated herein by reference in its entirety.

FIELD OF THE INVENTION

The present invention generally relates to the field of container separating equipment or denesters. More specifically, embodiments of the present invention pertain to an apparatus and/or machine that separates or denests a stack of containers onto a conveyer belt, and a method of separating or denesting a stack of containers (e.g., onto a conveyer belt.)

DISCUSSION OF THE BACKGROUND

FIG. 1 shows a conventional clamshell container. FIG. 2 shows a stack of conventional clamshell containers. When separating a stack of clamshell containers, one common practice is to manually insert the containers into a box. Sometimes, the containers are inserted during the erection of the box, and sometimes, they are inserted by a packer in the field.

Conventional denesting machines utilize some form of distance setting or distance adjustment to pick or denest the desired number of containers. When relying on distance setting, the containers need to be nested the same way for each incoming new stack. Since each container vendor may nest their containers differently, using the same distance setting for each stack of containers may cause a change in the number of containers placed on the conveyer belt. On the other hand, changing or adjusting the distance setting for each vendor requires the machine to be shut down and recalibrated each time a stack of different containers is denested, resulting in undesired downtime and inefficient use of the machine.

SUMMARY OF INVENTION

This loss of efficiency can be overcome by a machine that automatically sets the distance setting based on an input of the number of containers. Thus, the present invention pertains at least in part to an apparatus and/or machine that separates or denests a stack of containers (e.g., clamshell containers) and a method of denesting or separating a stack of containers (e.g., onto a conveyer belt). For example, we disclose, teach and claim that with a counting device, the present apparatus/machine and method can separate an exact number or amount of containers (such as clam shells) from an existing stack. The present apparatus and/or machine automatically separates the same number of containers each time, thereby efficiently and cost-effectively separating such containers. For example, setting the input to 5 containers configures the machine to repeatedly and accurately separate 5 containers from the stack, regardless of the shape or size of the containers. The present apparatus/machine and method can use a camera, a vision system, a piezoelectric sensor, or a mechanical limit switch connected to a computer, processor or logic circuit to locate and count the edges of the containers in the stack. For example, the computer or processor may process images of the stack taken with the camera using a machine learning or pattern recognition algorithm.

In particular, the present invention relates at least in part to an apparatus, comprising a denester configured to separate a first stack of m containers (m is a positive integer of at least 2) into a plurality of second stacks of said containers, and a counting device configured to count the exact number of containers in the first stack. Each of the second stacks comprises an exact number of containers, the exact number being a positive integer less than m. The counting device may comprise a camera, a vision system, a piezoelectric sensor, or a mechanical limit switch, and may determine a space or gap between an nth container and an (n+1)th container in the first stack (where n is the exact number). Thus, each of the second stacks may comprise n containers, n is a positive integer less than m, and m is a positive integer of at least 2. In some embodiments, the denester comprises a piercing blade configured to be inserted between the nth container and the (n+1)th container in the first stack. In other or further embodiments, the denester comprises a processor configured to (i) locate the space or gap between the nth container and the (n+1)th container in the image, and (ii) store a vertical coordinate of the space or gap. In some embodiments, the denester may further comprise a servo motor configured to receive the vertical coordinate of the space or gap and/or move the piercing blade to the space or gap. In the present apparatus, the vision system may comprise a camera configured to generate an image of the first stack. Other or further embodiments of the present apparatus may further comprise (1) a conveyer belt configured to receive the plurality of second stacks and/or (2) an input system configured to allow a user to enter a value of n into the apparatus.

For example, the denester may comprise a first mechanism configured to control a lateral position of the piercing blade. The first mechanism may comprise, for example, an air cylinder configured to insert the piercing blade into the space or gap. The denester may further comprise a second mechanism configured to cause the piercing blade to separate an end one of the plurality of second stacks from the first stack. The second mechanism may comprise, for example, an air cylinder and a lever configured to tilt or pivot the piercing blade.

In other or further embodiments, the present apparatus further comprises a stack holder configured to hold the first stack. The stack holder may include support gates configured to (i) support the first stack when closed and (ii) enable separation of the end one of the plurality of second stacks after the piercing blade is inserted between the nth container and the (n+1)th container in the first stack when open. In such embodiments, the denester may comprise a support blade configured to support the (m−n) containers of the first stack above the nth container when the support gates are open.

The present invention also relates to a method of separating stacked containers, comprising counting an exact number of containers in a first stack of m containers using a counting device, and separating the exact number of containers from the first stack using a denester configured to separate the first stack into a plurality of second stacks of said containers. The exact number is a positive integer less than m, and m is a positive integer of at least 2. The counting device may comprise a camera, a vision system, a piezoelectric sensor, or a mechanical limit switch, and counting the exact number of containers may comprise identifying a space or gap between an nth container and an (n+1)th container in a first stack of m containers (where n is the exact number and is a positive integer less than m). In general, the method is conducted or repeated until a number of containers in the first stack is less than the exact number (e.g., n).

The containers may be any stackable container having a structure that allows the container to be separated from the first stack. For example, the containers may have at least one side wall, end wall, or a portion thereof with a height less than the gap between adjacent nested containers in the stack, where the gap is the base-to-base or bottom-to-bottom distance between adjacent nested containers. The containers may also comprise one or more materials selected from the group consisting of polymers, mixtures and/or blends of two or more polymers, paper, and laminates of one or more polymers and/or one or more layers of paper. For example, the polymer may comprise polyethylene, polypropylene, or polystyrene, and the paper may comprise cardboard, paperboard, boxboard, or corrugated board.

In some embodiments of the method, separating the second stack of n containers comprises inserting a piercing blade between the nth container and the (n+1)th container in the first stack. In other or further embodiments of the method, identifying the space or gap may comprise imaging the first stack of containers with a camera, entering a value of n in the denester, determining a vertical coordinate of the space or gap, and/or storing the vertical coordinate of the space or gap. In some examples, the method further comprises transmitting the vertical coordinate to a servo motor and/or moving the piercing blade to the space or gap using a servo motor.

For example, separating the second stack of n containers may comprise laterally inserting the piercing blade into the space or gap using a first mechanism configured to control a lateral position of the piercing blade. The first mechanism may comprise an air cylinder, for example. Separating the second stack of n containers may further comprise causing the piercing blade to tilt or pivot using a second mechanism. The second mechanism may comprise an air cylinder and a lever, for example.

In some embodiments, the method may further comprise placing a first stack of m containers in a stack holder, wherein m is a positive integer of at least 2. The stack holder may comprise support gates, and the method may further comprise supporting the first stack with the support gates, and optionally, (a) opening the support gates after the piercing blade is inserted between the nth and (n+1)th containers and/or (b) inserting a support blade into the first stack between the nth and (n+1)th containers before opening the support gates. In other or further embodiments, the method may further comprise receiving the separated stack of n containers on a conveyer belt and moving the separated stack of n containers away from the stack holder with the conveyor belt.

The present invention also relates to a method of making an apparatus, comprising assembling a denester configured separate a first stack of m containers into a plurality of second stacks of said containers, and operably connecting a counting device to the denester. Each of the second stacks comprises an exact number of containers, the exact number is a positive integer less than m, and m is a positive integer of at least 2. The counting device, which may comprise a camera, a vision system, a piezoelectric sensor, or a mechanical limit switch, is configured to count the exact number of containers in the first stack. In one example, the counting device is configured to determine a space or gap between an nth container and an (n+1)th container in the first stack, n being the exact number.

In some embodiments, assembling the denester further comprises attaching a piercing blade to a first mechanism configured to control a lateral position of the piercing blade in the denester. In further embodiments, assembling the denester may further comprise attaching a support blade configured to support the (m−n) containers of the first stack (e.g., while the n containers are separated from the first stack) to the first mechanism.

In other or further embodiments, the method may further comprise operably connecting a processor to the counting device, the processor being configured to (i) locate the space or gap between the nth container and the (n+1)th container in the image, and (ii) store a vertical coordinate of the space or gap (e.g., from information from the counting device). As for other aspects of the present invention, the counting device may comprise a vision system and/or camera configured to generate an image of the first stack. For example, the vision system may comprise a camera configured to generate an image of the first stack. In some such embodiments, assembling the denester may comprise attaching or connecting a servo motor to a body of the denester, the servo motor being configured to receive the vertical coordinate of the space or gap. Alternatively or in addition, the method of making the apparatus may further comprise operably connecting an input system to the denester, the input system being configured to allow a user to enter a value of n into the apparatus.

In other or further embodiments, the method of making the apparatus may comprise attaching a servo motor to the first mechanism, the servo motor being configured to move the piercing blade to the space or gap. The first mechanism may comprise, for example, an air cylinder configured to insert the piercing blade into the space or gap. In addition, the method may further comprise attaching a second mechanism to the piercing blade or to a body of the denester, the second mechanism being configured to cause the piercing blade to separate the second stack (of n containers) from the first stack (of m containers). The second mechanism may comprise, for example, an air cylinder and a lever configured to tilt or pivot the piercing blade.

In some embodiments, the method of making the apparatus may further comprise assembling a stack holder configured to hold the first stack of containers. The stack holder may comprise support gates configured to (i) support the first stack when closed and (ii) open to enable separation of the end one of the plurality of second stacks of containers (e.g., after the piercing blade is inserted between the nth container and the (n+1)th container in the first stack).

The present denester is designed to perform the same general function of the conventional machines described above, but with better count accuracy. It does not rely on a distance setting approach, but instead utilizes a counting device such as a computerized vision system to locate and count the edges of the containers in the stack. The present apparatus and/or machine is designed to be adaptable to different types of containers that may be constructed with different shapes and/or sizes. These and other advantages of the present invention will become readily apparent from the detailed description of various embodiments below.

BRIEF DESCRIPTION OF THE DRAWINGS

FIG. 7 is a view of the present denester with (i) a lower air cylinder that rotates the piercing blade and deposits the denested stack onto the conveyer belt and (ii) a support blade that supports the bulk stack while the support gates are open.

DETAILED DESCRIPTION

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Embodiments of the present invention relate to an apparatus and/or machine that separates stacks of containers such as clamshell containers into groups of a predetermined or preset number of containers. The denested containers may be dropped or placed into another container, such as a box, and/or onto a surface, such as a conveyer belt.

Figure 1:
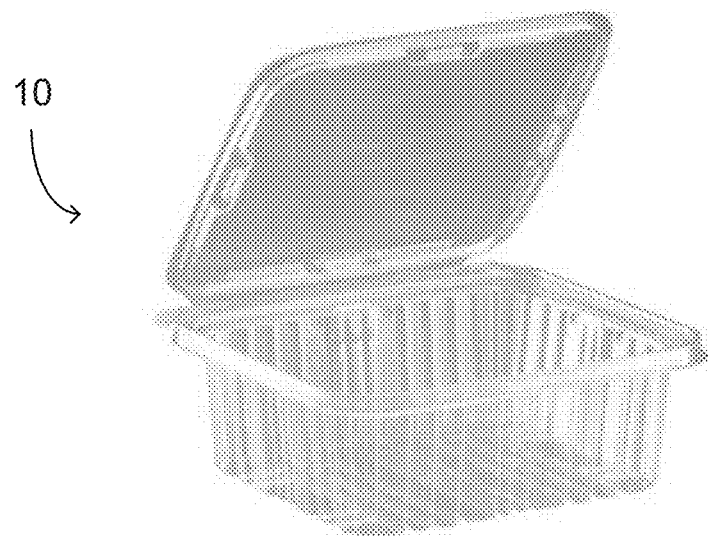
FIG. 1 shows a conventional clamshell container.

A clamshell container is a one-piece container comprising two halves joined by a hinge area which allows the structure to come together and close. FIG. 1 shows an example of a conventional clamshell container 10. Such containers may be used for food storage or for other purposes. Furthermore, the containers to be denested are not limited to clamshell containers, and can be any stackable container having a structure that can be denested or otherwise processed by the present apparatus. For example, the container may be or comprise a tray having at least one side wall or end wall (or a portion thereof) with a height less than the gap between adjacent nested trays (e.g., the base-to-base or bottom-to-bottom distance between adjacent nested trays). Such containers may comprise and/or be constructed out of a variety of materials including plastics (e.g., polyethylene, polypropylene, polystyrene and/or another polymer), mixtures or blends of such polymers, paper (e.g., cardboard, paperboard, boxboard, corrugated board, etc.), laminates of such polymers and/or paper, or any other material that allows the containers to be easily denested without damaging the container or the machine.

Figure 2:
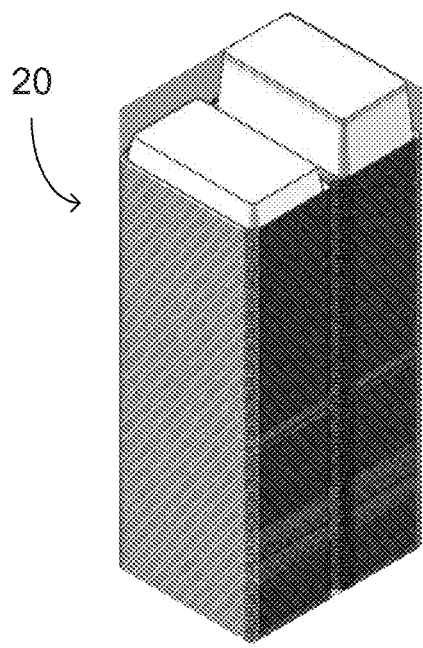
FIG. 2 shows a stack of nested clamshell containers to be separated.

FIG. 2 shows a nested stack of clamshell containers 20 to be separated by the present apparatus. The original stack 20 is called the bulk stack. The bulk stack feeds into a stack holder or other mechanism (the containers are face down as shown in FIG. 2), where the bulk stack is split into a smaller stack that is removed from the bulk stack (e.g. by dropping or depositing them onto a conveyer belt).

Figure 3:
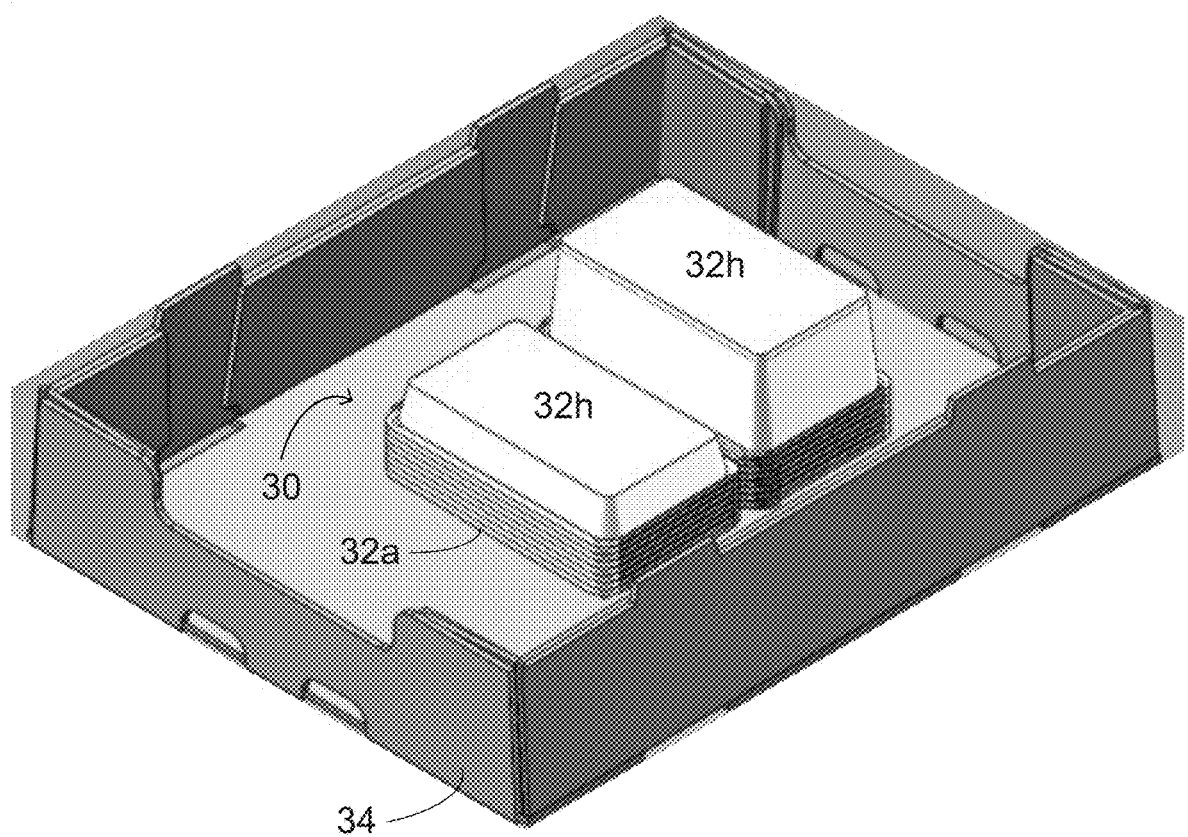
FIG. 3 shows a stack of clamshell containers that have been separated from a larger stack into a box.

FIG. 3 shows a separated stack 30 of eight clamshell containers 32a-h in a box 34. The present apparatus and method may, for example, deposit the containers 32a-h into the box 34, but the invention is not limited to such an outcome. The number of clamshell containers 32a-h to be separated may be selected by the machine operator, pre-programmed by the machine manufacturer, or selected remotely (e.g., by a technician). If the same number of containers 32a-h is to be separated or denested, the setting(s) do not have to be changed even when a new stack of containers having a different size, or from a different vendor, are fed into the denester. As long as the edges of the containers 32a-h are visible, the counting device in the present apparatus distinguishes and/or counts each container.

Figure 4:
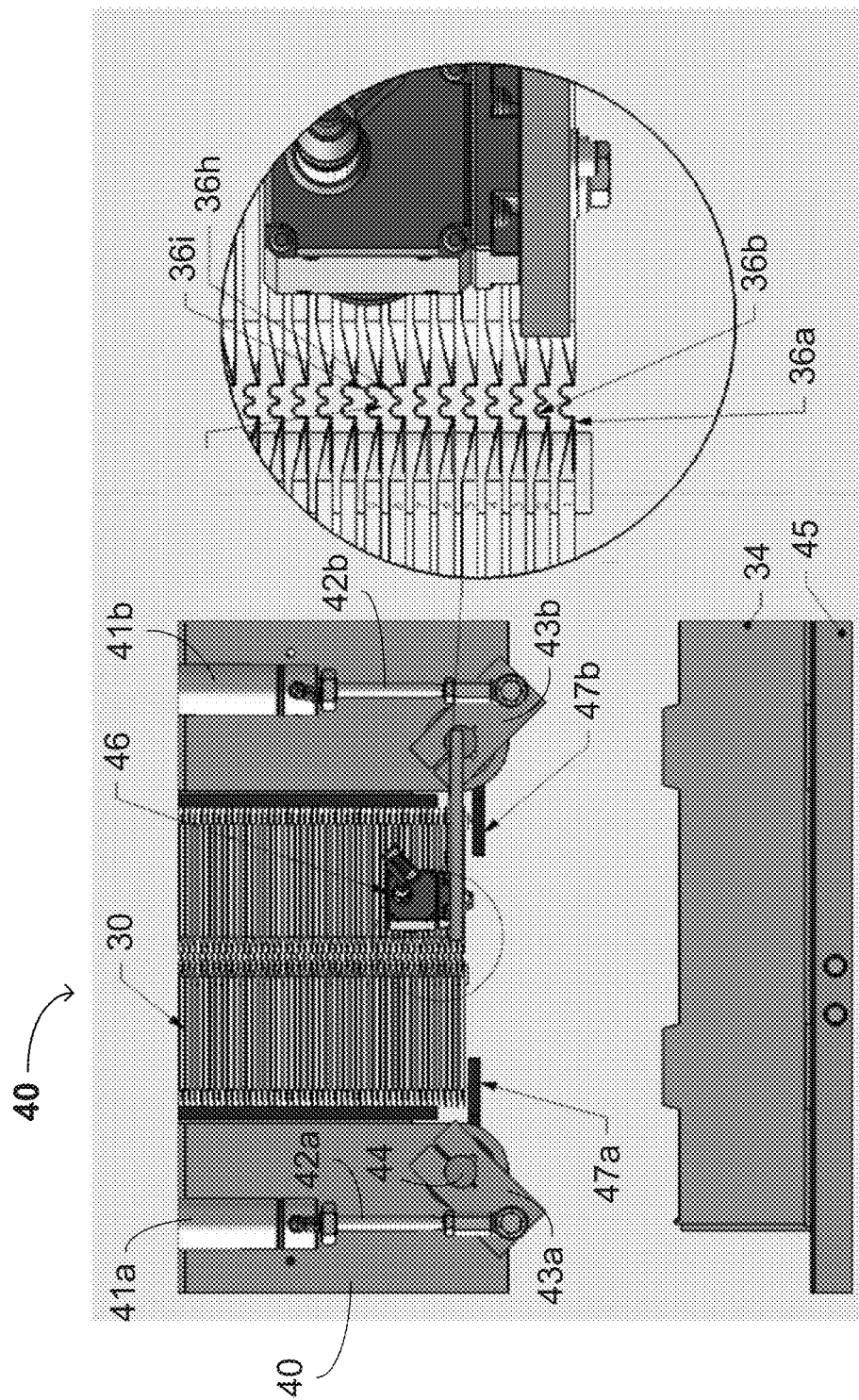
FIG. 4 is a diagram that shows certain components of the present denester and that explains how the present denester detects the position of the gap between the highest or last container of the stack to be separated and the lowest or first container of the remaining bulk stack above it.

FIG. 4 shows a side view of a stack holder 40, a conveyer belt 45, a box 34 on the conveyer belt 45, and the vision system (e.g., camera) 46 that identifies and counts the container edges 36a-x starting from the bottom of the stack. Each support gate 47a-b in the stack holder 40 is opened and closed by a mechanism that includes an air cylinder 41a-b (which may be computer-controlled). Each air cylinder contains a respective piston 42a-b connected to a plate 43a-b at a first pivot point. The plate 43a-b is connected to the respective support gate through an axle or shaft 44 that rotates the support gate when the piston 42a-b is extended or retracted. Alternatively, the shaft 44 may include a mechanism (not shown) such as a cam or teeth/gear that extends or retracts the support gate when the shaft 44 rotates. A pneumatic mechanism (e.g., using compressed air) drives and retracts the piston in order to open or close the gate. During the moment of separation, the support gates 47a-b open, and the denested stack 36a-h is dropped from the stack holder 40 (e.g., into the box on the conveyer belt).

The conveyer belt 45 may comprise a belt and a system of pulleys that roll the belt along a plurality of rollers. The belt may comprise an outer material that is in contact with the box 34 or the denested containers 36a-h, and an inner material that is in contact with the rollers and/or pulleys. The outer material may be or comprise rubber or a polymer such as PVC. The inner material may be or comprise a woven fabric having a warp and/or weft, such as polyester or nylon. The conveyer belt 45 may transport boxes 34 that pass underneath the stack holder 40 in order to collect the denested stack 36a-h in the box 34 during the moment of separation.

The camera 46 takes an image of the stack 30 with the edges 36a-x (or at least edges 36a-i, where i =n +1) of each clamshell container 32a-x clearly visible, as shown in the blow-up view in FIG. 4. A processor (not shown) determines the number of edges in the image and the vertical distance to the gap 38 between the last edge in the stack of containers 30 to be denested and the first edge of the remaining stack of containers (for example, between the edges 36h and 36i of the eighth and ninth containers 32h and 32i). The gap 38 is assigned a vertical coordinate. The processor sends the vertical coordinate to a machine controller (not shown).

Counting devices other than a camera and processor are suitable for use in the present invention, such as a conventional vision system, a piezoelectric sensor, or a mechanical limit switch. For example, the mechanical limit switch may comprise a micro-sized (e.g., miniature, subminiature, micro, mini-micro or ultra micro) limit switch or limit switch actuator, configured to (1) move vertically against the edges of the containers in the first stack and (2) detect the edges of individual containers in the first stack by detecting the edges and the gaps between the edges (or detecting a difference between the edges and the gaps). When encountering an edge, the limit switch may actuate and count one edge. As it moves upward along the first stack of containers, the limit switch actuator falls into the gap between the counted container and the next container, and deactivates. Thereafter, the limit switch encounters the next edge, adds one edge to the count, falls into the next gap, and so on.

Figure 5:
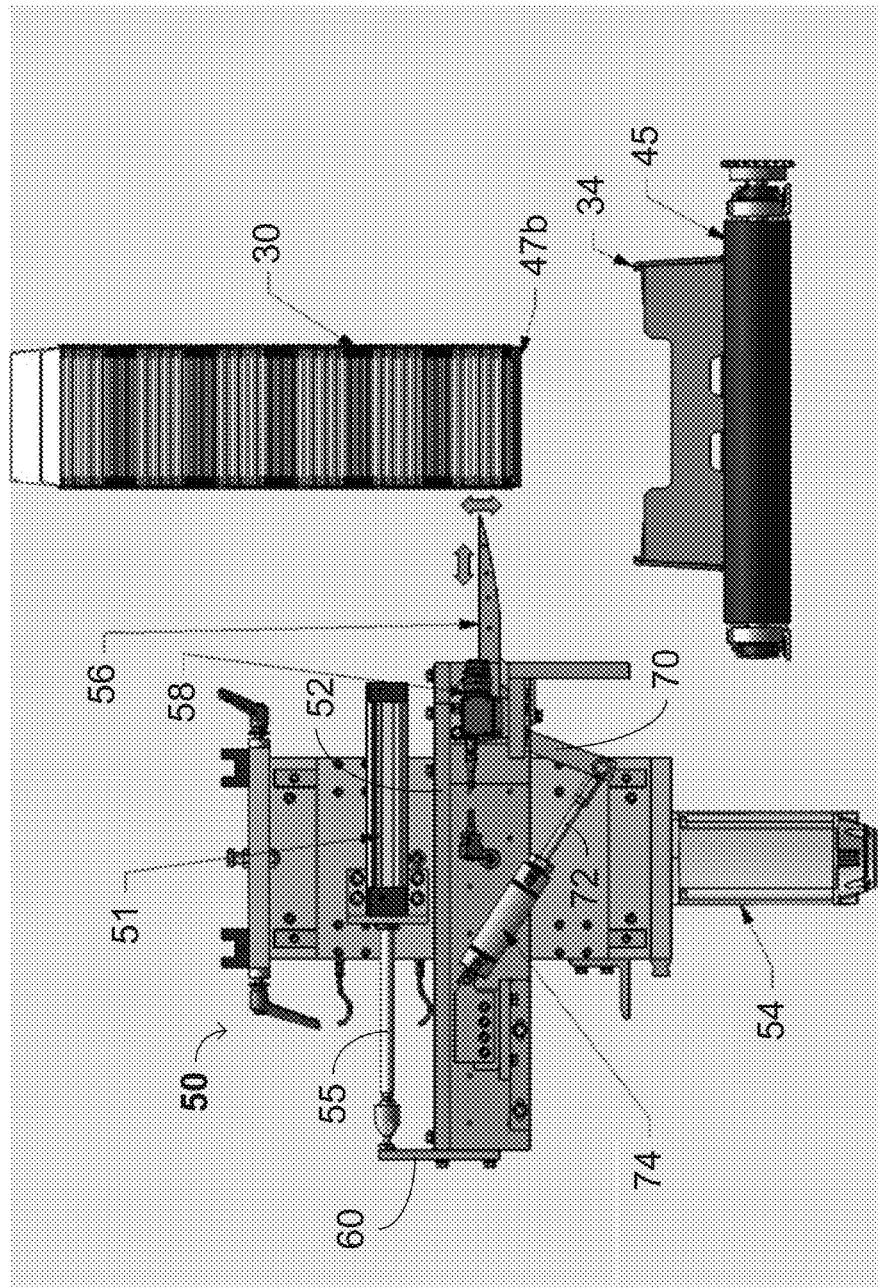
FIG. 5 is a view of the present denester with a piercing blade in a retracted position, an upper air cylinder that controls the horizontal position of the piercing blade, and a servo motor that controls the vertical position of the piercing blade.

FIG. 5 shows the present denesting apparatus 50, including an upper air cylinder 51 and a servo motor 54, both of which are instructed and/or controlled by the machine controller (not shown) to move a piercing blade 56 up and down the stack 30, as well as towards and away from the stack 30. The upper air cylinder 51 uses a piston 55 to horizontally move the section 52 to which the piercing blade 56 is attached or connected so that the piercing blade 56 extends into the stack of containers 30. The servo motor 54 turns a screw (not shown) that moves machine 50, including the blade 56, vertically. The machine controller instructs the servo motor 54 to move the machine 50 up or down in accordance with the vertical coordinate from the vision system (e.g., including the camera 58). When the piercing blade 56 is in the vertical position corresponding to the vertical coordinate, the piercing blade 56 is extended toward the stack of nested containers 30 by the upper air cylinder 51 to wedge them apart.

The part(s) of the apparatus 50 that include the upper air cylinder 51, the lower air cylinder 74, the piercing blade 56 and a support blade 62 (FIG. 7) move up and down as one unit when the servo motor 54 is activated. The servo motor and its housing 54 may be mounted on or secured to a foundational frame (e.g., using screws, nuts and bolts, openings and rubber gaskets, combinations thereof, etc.).

Figure 6:
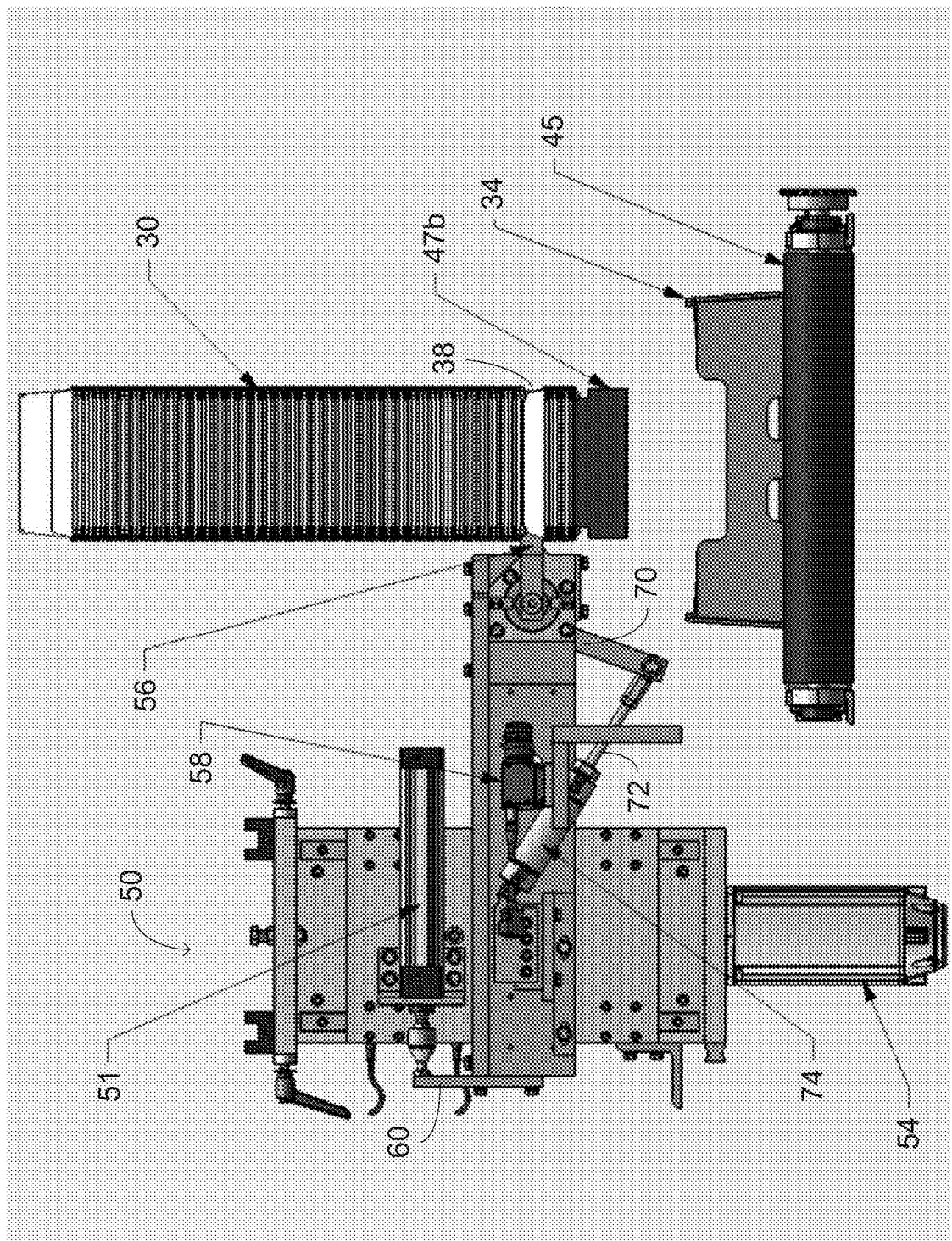
FIG. 6 is a view of the present denester with the piercing blade in an extended position and support gates in an open position in order to drop the denested stack into a box.

FIG. 6 is a side diagram of the present denester 50 in which the upper air cylinder 51 has moved the piercing blade 56 toward the stack 30 and into the gap 38, causing a separation between adjacent (e.g., the eighth and ninth) containers 32h-i. The piston 55 (FIG. 5) may be connected to a plate 60 on the apparatus 50. The denester 50 may further include a mechanism such as pneumatics to drive and retract the piston 55. When the blade 56 is inserted into the stack (FIG. 6), the support gates 47a-b retract or fall away to allow the downward motion of the separated containers. In the example of FIG. 6, eight (8) containers are separated by the apparatus 50. The support gates 47a-b are controlled by two air cylinders 41a-b (FIG. 4), which receive instructions from the machine controller. The support gates 47a-b may be retracted or dropped at the same time that the upper air cylinder 51 extends the piercing blade 56 or shortly thereafter.

FIG. 7 is a side diagram of the present denester 50 in which the piercing blade 56 has rotated and enabled the denested stack 32a-h to fall into the box 34 on the conveyor belt 45. The lower air cylinder 74 retracts a piston 72 (FIGS. 5-7), causing the piercing blade 56 to rotate downward after the support gates 47a-b open. The piston 72 is connected to a lever 70 (FIG. 5-7) that rotates the piercing blade 56. A pneumatic mechanism may drive and retract the piston 72 within the lower air cylinder 74. The rotation of the piercing blade 56 causes a complete separation of the clamshell containers 32a-h from the bulk stack 30', causing the denested stack of clamshell containers 32a-h to fall into the box 34 on the conveyer belt 45 (or directly onto the conveyer belt 45 in the absence of a box). A support blade 62 that is parallel to the piercing blade 56 when the piercing blade 56 is first inserted into the stack of containers 30 supports the bulk stack 30' while the support gates 47a-b are open.

After the clamshell containers 32a-h have been deposited into the box 34, the piercing blade 56 rotates upward to its original position, the support gates 47a-b close, and the upper air cylinder 51 retracts the piercing and support blades 56 and 62 away from the stack 30'. The assembly 50 is returned to its starting position as shown in FIG. 5. When the blades 56 and 62 are retracted from under the bulk stack 30', the bulk stack 30' rests on the closed support gates 47a-b. The ninth clamshell container 32i in the previous cycle shown in FIG. 4 becomes the first clamshell container in the new cycle, although the apparatus and method are not limited to separating 8 containers.

Any number of containers (e.g., 1-100, or any number or range of numbers therein) may be separated or denested. Generally, less than all of the nested containers in the bulk stack 30 are separated, and in various examples, when the number of nested containers in the original bulk stack 30 is x, the number of containers to be separated or denested is x/m rounded down to the nearest integer, m being an integer of 2 or more (e.g., 4, 5, 6, 8, 10, 15, 20, or more). The conveyer 45 moves the box 34 with the clamshell containers 32a-h away and brings another empty box to receive clamshell containers. The vision system identifies and counts the number of container edges in the bulk stack, finds the new vertical coordinate, and the process is repeated.

Thus, the present apparatus and/or machine can automatically set the distance setting for a piercing blade or other mechanism to enter a bulk stack of containers and separate a smaller stack of containers from the bulk stack, based on the number of containers in the smaller stack. The present apparatus and/or machine is particularly suited for separating or denesting stacks of clamshell containers, but is applicable to other types of containers, and is not limited to clamshell containers. Using a camera or other counting device, the present apparatus/machine and method can separate an exact number of containers from an existing stack automatically, accurately, efficiently and cost-effectively. The present denester and method improves the count accuracy of conventional denesting machines. It does not rely on a distance setting approach, but instead utilizes a counting device such as a computerized vision system to locate and count the edges of the containers in the stack.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

We claim:

1. An apparatus, comprising:
   a denester configured to separate a first stack of m containers into a plurality of second stacks of said containers, wherein each of the second stacks comprise an exact number of containers, the exact number being a positive integer less than m, and m is a positive integer of at least 2, and
   a counting device configured to count the exact number of containers in the first stack, the counting device comprising a camera or a vision system configured to generate an image of the first stack.

2. The apparatus of claim 1, wherein the counting device is further configured to determine a space or gap between an nth container and an (n+1)th container in the first stack, n being the exact number.

3. The apparatus of claim 1, further comprising a stack holder configured to hold the first stack.

4. An apparatus, comprising:
a denester configured to separate a first stack of m containers into a plurality of second stacks of said containers, wherein the denester comprises a piercing blade configured to be inserted between the nth container and the (n+1)th container in the first stack, each of the second stacks comprise an exact number of containers, the exact number being a positive integer less than m, and m is a positive integer of at least 2; and
a counting device configured to determine a space or gap between an nth container and an (n+1)th container in the first stack, n being an exact number, and count the n containers in the first stack.

5. The apparatus of claim 4, wherein the counting device comprises a camera, a vision system, a piezoelectric sensor, or a mechanical limit switch.

6. An apparatus, comprising:
a denester configured to separate a first stack of m containers into a plurality of second stacks of said containers, wherein each of the second stacks comprise an exact number of containers, the exact number being a positive integer less than m, and m is a positive integer of at least 2;
a counting device configured to determine a space or gap between an nth container and an (n+1)th container in the first stack and count the n containers in the first stack, wherein n is the exact number; and
a processor configured to locate the space or gap between the nth container and the (n+1)th container in an image of the first stack, and store a vertical coordinate of the space or gap.

7. The apparatus of claim 6, wherein the denester comprises a servo motor configured to receive the vertical coordinate of the space or gap and/or move the piercing blade to the space or gap.

8. The apparatus of claim 6, wherein the counting device comprises a vision system, and the vision system comprises a camera configured to generate the image of the first stack.

9. An apparatus, comprising:
a denester configured to separate a first stack of m containers into a plurality of second stacks of said containers, wherein each of the second stacks comprise an exact number of containers, the exact number being a positive integer less than m, and m is a positive integer of at least 2,
a counting device configured to count the exact number of containers in the first stack, and
a stack holder configured to hold the first stack, wherein the stack holder comprises support gates configured to (i) support the first stack when closed and (ii) enable separation of the end one of the plurality of second stacks after the piercing blade is inserted between the nth container and the (n+1)th container in the first stack when open.

10. The apparatus of claim 9, wherein the denester comprises a support blade configured to support the (m−n) containers of the first stack above the nth container when the support gates are open.

11. A method of separating stacked containers, comprising:
counting an exact number of containers in a first stack of m containers using a counting device, wherein the exact number is a positive integer less than m, m is a positive integer of at least 2, the counting device comprises a camera or a vision system, counting the exact number of containers comprises identifying a space or gap between an nth container and an (n+1)th container in the first stack of m containers, n is the exact number, and identifying the space or gap comprises imaging the first stack of containers with the camera or the vision system; and
separating the exact number of containers from the first stack using a denester configured to separate the first stack into a plurality of second stacks of said containers.

12. The method of claim 11, further comprising repeating the method until a number of containers in the first stack is less than n.

13. The method of claim 11, further comprising receiving the separated second stacks of n containers on a conveyer belt and moving the separated second stacks of n containers away from the stack holder with the conveyor belt.

14. A method, comprising:
counting an exact number of containers in a first stack of m containers using a counting device, wherein the exact number is a positive integer less than m, m is a positive integer of at least 2, the containers have at least one side wall, end wall, or a portion thereof with a height less than the gap between adjacent nested containers in the stack, and the gap is the base-to-base or bottom-to-bottom distance between adjacent nested containers; and
separating the exact number of containers from the first stack using a denester configured to separate the first stack into a plurality of second stacks of said containers.

15. A method, comprising:
counting n containers in a first stack of m containers using a counting device by identifying a space or gap between an nth container and an (n+1)th container in the first stack of m containers, wherein n is a positive integer less than m, and m is a positive integer of at least 2; and
separating the n containers from the first stack using a denester configured to separate the first stack into a plurality of second stacks of said containers by inserting a piercing blade between the nth container and the (n+1)th container in the first stack.

16. The method of claim 15, wherein the counting device comprises a camera, a vision system, a piezoelectric sensor, or a mechanical limit switch.

17. The method of claim 15, wherein identifying the space or gap comprises imaging the first stack of containers with a camera or the vision system.

18. A method, comprising:
counting n containers in a first stack of m containers using a counting device by identifying a space or gap between an nth container and an (n+1)th container in the first stack of m containers, wherein n is a positive integer less than m, m is a positive integer of at least 2, and identifying the space or gap comprises entering a value of n in the denester, determining a vertical coordinate of the space or gap, and storing the vertical coordinate of the space or gap; and separating the exact number of containers from the first stack using a denester configured to separate the first stack into a plurality of second stacks of said containers.

\* \* \* \* \*